Patented Mar. 28, 1939

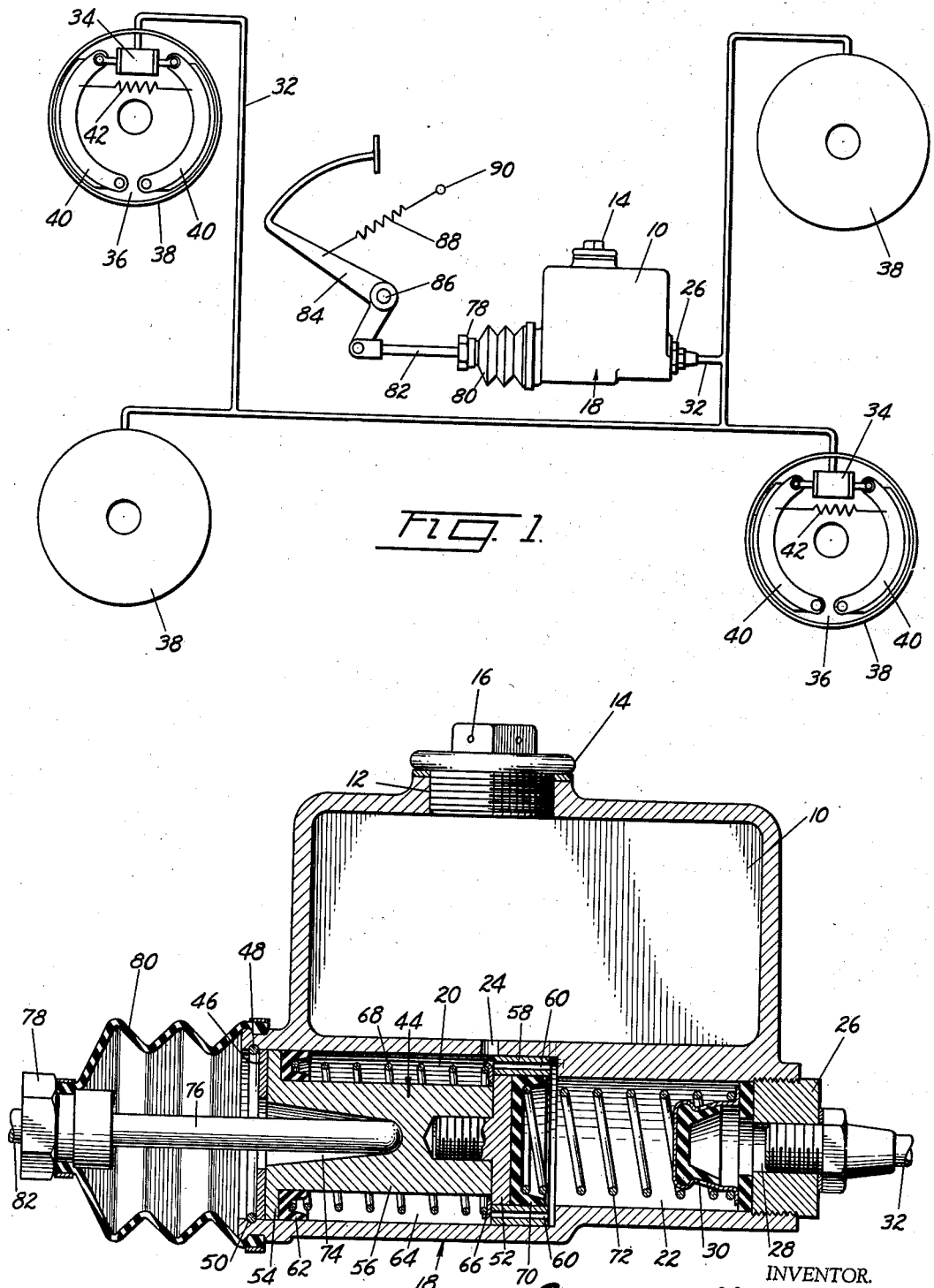

2,152,350

UNITED STATES PATENT OFFICE 2,152,350

FLUID PRESSURE PRODUCING DEVICE

Clarence V. Gardner, Detroit, Mich., assignor to Hydraulic Brake Company, Detroit, Mich., a corporation of California Application June 30, 1937, Serial No. 151,106

6 Claims. (Cl. 60—54.6)

This invention relates to fluid pressure braking systems, and more particularly to fluid pressure producing devices.

Heretofore fluid pressure producing devices included a cylinder and a piston reciprocable in the cylinder, and were generally constructed with a supply port and a compensating port providing communications between the cylinder and the reservoir. Because of the location of the compensating port in the wall of the cylinder slightly in advance of a sealing cup carried on the head of the piston, the cup is frequently injured by constantly moving over the compensating port. This is due to pressure on the fluid in the cylinder tending to squeeze or force the cup into the port, which frequently results in cutting a groove in the cup rendering it more or less ineffective for sealing purposes.

An object of this invention is to eliminate the conventional compensating port.

Another object of the invention is to provide a piston and a sealing cup therefor and means carried by the piston for protecting the cup against injury.

Another object of the invention is to provide a cylinder, a piston reciprocable therein, a sealing cup on the head of the piston, and a member on the head of the piston slidable relative thereto and adapted to receive the cup when the piston is in its fully retracted position.

A further object of the invention is to provide a cylinder having a piston reciprocable therein and a member slidable relative to the piston adapted to receive the sealing cup when in retracted position and also to provide a communication between that portion of the cylinder forward of the piston and the reservoir when the piston is in its retracted position.

Other objects of the invention will appear from the following description taken in connection with the drawing forming a part of this specification, and in which—

Fig. 1 is a schematic view of a fluid pressure braking system embodying the invention; and Fig. 2 is a vertical sectional view of the fluid pressure producing device connected in the system.

Referring to the drawing for more specific details of the invention, 10 represents a reservoir having a filling opening 12 normally closed as by a plug 14 provided with openings 16 for venting the reservoir to the atmosphere. A cylinder 18 at the base of the reservoir includes a large chamber 20 and a small chamber 22. The large chamber 20 has a port 24 providing a communication between the large chamber and the reservoir, and the small chamber 22 has a head 26 provided with a discharge port 28 controlled as by a two-way valve 30.

A fluid pressure delivery pipe or conduit 32 connected to the discharge port 28 has branches connected respectively to fluid pressure actuated motors 34 for the actuation of brakes of a conventional type. The brakes are arranged in pairs, one pair associated with the front wheels of the vehicle and another pair associated with the rear wheels of the vehicle.

As shown, each of the brakes includes a fixed support or backing plate 36, a rotatable drum 38 associated therewith, a pair of corresponding interchangeable friction elements or shoes 40 pivoted on the backing plate, and a fluid pressure actuated motor corresponding to the motors 34 mounted on the backing plate between the shoes and operative to actuate the shoes into engagement with the drum against the resistance of a retractile spring 42 connecting the shoes.

A piston 44 reciprocable in the cylinder 18 is retained against displacement by a washer 46 seated on a retaining ring 48 fitted in a circumferential groove 50 in the wall of the cylinder adjacent the open end of the large chamber 20. The piston has a head 52, a skirt 54, and an intermediate body portion 56. The diameter of the head 52 is substantially equal to the diameter of the small chamber 22, and a ring 58 on the head and movable relative thereto has a diameter substantially equal to the diameter of the large chamber 20. The ring is provided with a plurality of spaced passages 60. The skirt 54 of the piston has thereon a sealing cup 62, and the body of the piston has a reduced diameter providing in conjunction with the wall of the cylinder an annular chamber 64 communicating with the reservoir by way of the port 24.

A washer 66 sleeved on the body portion of the piston is normally held against the back of the piston head 52 by a spring 68 interposed between the washer and the sealing cup 62. The spring also serves to retain the sealing cup 62 against displacement, and a sealing cup 70 seated on the head of the piston is held against displacement by a spring 72 interposed between the cup 70 and the two-way valve 30. This spring also serves to return the piston to its retracted position.

A recess 74 in the back of the piston receives one end of a thrust pin 76, the other end of the thrust pin having thereon a coupling 78 connected as by a flexible boot 80 to the open end of the cylinder 18 for the exclusion of dust and other foreign substances, and a rod 82 connects the coupling 78 to a foot pedal lever 84 mounted on a stub shaft 86 and connected as by a retractile spring 88 to a fixed support 90.

In operation, upon depressing the foot pedal lever 84, force is transmitted from the lever to the piston 44, resulting in movement of the piston on its compression stroke. During the initial movement of the piston on its compression stroke, the ring 58 engages the shoulder at the junction between the large chamber 20 and the small chamber 22. This results in closing the communication between that portion of the cylinder forward of the piston and the reservoir; and, as the piston advances on its compression stroke there is a relative movement between the piston and the ring 58, and the sealing cup 70 on the head of the piston is moved from its normal position within the ring 58 into the small chamber 22 so as to effectively inhibit the passage of fluid past the piston. During this movement of the piston fluid is displaced from the small chamber 22 past the two-way valve 30, which inhibits retrograde movement of the fluid, and through the discharge port 28 and the fluid pressure delivery pipe 32 and its respective branches into the fluid pressure actuated motors 34, causing actuation of the motors with the resultant spreading of the shoes 40 into engagement with the drums against the resistance of the retractile springs 42.

Upon release of the foot pedal lever 84, the lever is returned to its normal or retracted position under the influence of the retractile spring 88. As the foot pedal lever moves to its retracted position, the thrust pin 76 connected thereto by the coupling 78 and the rod 82 is likewise retracted. This results in release of the piston 44, whereupon the spring 72 becomes effective to return the piston to its retracted position. As the piston returns to its retracted position, there is a relative movement between the piston and the ring 58, and the sealing cup 70 on the head of the piston enters the ring 58. The cup frictionally grips the ring and forces it to its seat on the washer 66 held against the back of the piston head 52 by the spring 68. This results in establishing communication between that portion of the cylinder forward of the piston and the reservoir by way of the passages 60 in the ring 58, the chamber 64, and the port 24.

During this operation fluid is returning to the cylinder from the fluid pressure actuated motors 34, and the fluid pressure delivery pipes connecting the motors to the cylinder, under the influence of the retractile springs 42 connecting the shoes 40 of the respective brakes. Should there be an excess of fluid over and above the quantity required to completely fill the cylinder, caused by expansion due to heat, such surplus may be returned from the cylinder to the reservoir through the passages 60 in the ring 58, the annular chamber 64, and the port 24.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a double diametral cylinder, a piston reciprocable therein, a ring on the head of the piston movable axially with relation thereto, means for advancing the ring with the piston during the initial movement of the piston on its compression stroke and for retaining the ring against the shoulder at the junction of the large and small chambers of the cylinder as the piston proceeds on its compression stroke, means for returning the piston to its retracted position, and a sealing cup on the head of the piston received by the ring when the piston is in its fully retracted position.

2. A fluid pressure producing device comprising a double diametral cylinder, a piston reciprocable therein, a ring on the piston having passages therethrough, said ring movable on the piston within the large chamber of the cylinder, a sealing cup on the head of the piston received by the ring when the piston is in fully retracted position, and means for causing relative movement between said cup and ring during the compression stroke of the piston.

3. A fluid pressure producing device comprising a double diametral cylinder, a piston movable therein, a ring slidable on the head of the piston having passages therethrough, a sealing cup on the head of the piston received by the ring when the piston is in fully retracted position, and means for causing relative movement between said cup and ring during the compression stroke of the piston.

4. A fluid pressure producing device comprising a double diametral cylinder, a piston reciprocable therein, means for advancing the piston, means for returning the piston to its retracted position, a movable ring on the head of the piston having passages therethrough, a sealing cup on the head of the piston received by the ring when the piston is in its fully retracted position, and means for causing relative movement between said cup and ring during the compression stroke of the piston.

5. A fluid pressure producing device comprising a reservoir, a cylinder supplied therefrom, a piston reciprocable in the cylinder, means for advancing the piston, means for returning the piston to its retracted position, a movable ring on the head of the piston having passages therethrough, means for moving the ring in unison with the piston during the initial movement of the piston, means for arresting the ring upon further movement of the piston, and a sealing ring on the head of the piston received by the ring when the piston is in retracted position.

6. A fluid pressure braking system comprising a pressure producing device including a reservoir, a double diametral cylinder supplied therefrom, fluid pressure actuated motors connected to the cylinder, elements actuated by the motors, a piston reciprocable in the cylinder, means for advancing the piston, means for returning the piston to its retracted position, a ring on the head of the piston movable axially thereto having passages therethrough, a sealing cup on the head of the piston adapted to enter the ring when the piston is in fully retracted position, and means for causing relative movement between said cup and ring during the compression stroke of the piston.

CLARENCE V. GARDNER.